United States Patent Office 3,441,571
Patented Apr. 29, 1969

---

3,441,571
PRODUCTION OF SUBSTITUTED ISOINDOLENINES
Henry Fletcher, Moston, Manchester, England, assignor, by mesne assignments, to Wallace & Tiernan Inc., Orange, N.J., a corporation of Delaware
No Drawing. Original application Nov. 16, 1964, Ser. No. 411,597, now Patent No. 3,322,785, dated May 30, 1967. Divided and this application Jan. 20, 1967, Ser. No. 627,576
Claims priority, application Great Britain, Nov. 19, 1963, 45,548/63, 45,549/63, 45,550/63
Int. Cl. C07d 27/56, 27/54
U.S. Cl. 260—326.1                                  5 Claims

ABSTRACT OF THE DISCLOSURE

Compounds of formula

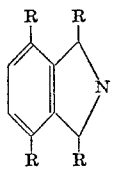

are obtained by reacting a 2,5-dialkyl-substituted pyrrole having the formula:

wherein the groups R are the same of different and each is a lower alkyl group containing from one to six carbon atoms, with an aqueous, nonoxidizing mineral acid, the reaction being carried out substantially in the absence of molecular oxygen.

---

This application is a divisional of U.S. Ser. No. 411,597, now U.S. Patent No. 3,322,785.

The present invention relates to the production of heterocyclic organic compounds and in particular to substituted isoindolenines and their production.

According to this invention, the compounds of Formula Ia

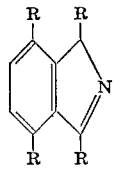

are obtained by reacting a 2,5-dialkyl-substituted pyrrole having the formula:

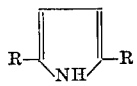

wherein the groups R are the same or different and each is a lower alkyl group containing from one to six carbon atoms, with an aqueous, nonoxidizing mineral acid, the reaction being carried out substantially in the absence of molecular oxygen.

Any or all of the alkyl groups R in Formulae Ia and IIa may be (for example, methyl, ethyl, n-propyl, isopropyl, n-butyl, isobutyl, t-butyl, n-amyl or n-hexyl groups. The 2,5-dialkyl-substituted pyrrole may be, for example, 2,5-dimethylpyrrole or 2,5-diethylpyrrole.

The process according to this invention is carried out using an aqueous, nonoxidizing mineral acid, so that it is effected without bringing about any substantial oxidation of the 2,5-dialkyl-substituted pyrrole. The acid may be, for example, an aqueous solution of sulphuric acid, phosphoric acid or hydrochloric acid. The reaction of the acid reactant with the pyrrole IIa may, in general, be carried out by heating the reactants together under reflux conditions.

The reaction may be carried out substantially in the absence of molecular oxygen by operating in an atmosphere of nitrogen or other nonoxidizing inert gas. When carried out on the small scale, the process may also be conveniently conducted in a gloved box in which the air present has been replaced by nitrogen or other inert gas. On a larger scale, the apparatus in which the process is carried out can be freed from air by flushing out with the inert gas and maintaining an atmosphere of inert gas during the production and recovery of the desired product, conveniently at a slightly superatmospheric pressure to obviate leakage of atmospheric oxygen into the apparatus.

The product of the reaction will, in general, comprise a salt of the desired substituted isoindolenine with the acid used as reactant. The free isoindolenine itself may be liberated from this product by treatment with alkali in an amount at least sufficient to neutralize any free acid present in the reaction product and the acid combined in the salt; for example, an aqueous solution of an alkali metal hydroxide, carbonate or bicarbonate may be added to the reaction product. The alkali used is a stronger base than the organic base to be liberated from the salt.

The obtained product may be washed and dried, or further purified, and isolated by per se conventional methods, taking care to exclude contacting free substituted isoindolenine base with molecular oxygen. Alternatively to the isolation of the free substituted isoindolenine base, the free base comprised in the product of the reaction may be converted to a desired salt of another inorganic or organic acid, by per se conventional procedures, taking care to exclude molecular oxygen at base until the dry salt is obtained.

The following examples illustrate the present invention. Parts by weight shown therein bear the same relation to parts by volume as do kilograms to liters. Percentages are expressed by weight unless otherwise stated.

EXAMPLE 1

A mixture of 2 parts by weight of 2,-5-dimethylpyrrole, 380 parts by volume of water and 20 parts by volume of 2 N-sulphuric acid was refluxed for 18 hours in an atmosphere of nitrogen.

The resulting product was made alkaline by adding aqueous sodium hydroxide solution. The solid which was thus precipitated was crystallized from diisopropyl ether to yield 1.0 part by weight of 1,3,4,7-tetramethylisoindolenine as needle-shaped crystals having melting point 143° to 144° C. The yield obtained was 55.3% theoretical.

EXAMPLE 2

By carrying out the procedure described in Example 1 using, instead of aqueous sulphuric acid as acid reactant, equivalent proportions of aqueous phosphoric acid and aqueous hydrochloric acid, the product 1,3,4,7-tetramethylisoindolenine is produced identical to that produced in Example 1.

The oxygen-scavenging properties of the substituted isoindolenines of the present invention are illustrated, for instance, by the following examples carried out with 1,3,4,7-tetramethylisoindolenine and its salts.

EXAMPLE A

The test solution was produced by heating together, under reflux conditions, 22.6 parts by weight of acetonylacetone and 49.9 parts by weight of ammonium sulphate in 400 parts by volume of water. The solution, although produced by a process differing from that of Examples 1 and 2, consisted essentially of 1,3,4,7-tetramethylisoindolenine sulphate.

Samples, each of 250 milliliters, of neutral water initially containing 1.6 parts per million of oxygen were mixed with the quantities of the 1,3,4,7-tetramethylisoindolenine sulphate solution specified in Table I under Winkler test conditions. The results of the tests are also given in the table.

Table I

| Quantity of solution added (milliliters): | Oxygen content of treated solution, parts per million |
|---|---|
| 1 | 0.52 |
| 5 | Nil |
| 10 | Nil |
| 25 | Nil |

A nil result in the second column signifies an immeasurably low proportion of oxygen present in the water. The results demonstrate the effectiveness of 1,3,4,7-tetramethylisoindolenine sulphate as an oxygen-scavenging agent.

EXAMPLE B

The procedure described in Example A was carried out using samples, each of 280 milliliters of neutral water initially containing 2.6 parts per million of oxygen. The samples were left for 3 days at 21° C in admixture with the specified amounts of the 1,3,4,7-tetramethylisoindolenine sulphate solution under Winkler tests conditions.

The results of the tests are given in Table II, in which a nil result in the second column signifies an immeasurably low proportion of oxygen.

Table II

| Quantity of solution added (milliliters): | Oxygen content of treated solution, parts per million |
|---|---|
| 0.5 | 0.55 |
| 1 | Nil |
| 2 | Nil |

The results again demonstrate the effectiveness of 1,3,4,7-tetramethyisoindolenine sulphate as an oxygen scavenging agent.

EXAMPLE C

A solution of 1,3,4,7-tetramethylisoindolenine sulphate, prepared as described in Example A, was admixed with sodium hydroxide to raise the pH value of the aqueous mixture to the values stated in Table III. The resulting solutions thus consisted essentially of free 1,3,4,7-tetramethylisoindolenine.

Samples, each of 280 milliliters, of water initially containing 7.12 parts per million of oxygen were treated under Winkler test conditions by the procedure described in Example B. The results are given in Table III, in which a nil result in the third column signifies a immeasurable low proportion of oxygen.

TABLE III

| Quantity of solution added (milliliters) | pH value of solution | Oxygen content of treated solution (parts per million) |
|---|---|---|
| 1 | 4.6 | Nil |
| 0.5 | 12.0 | 0.8 |
| 1 | 12.0 | Nil |
| 2 | 12.0 | Nil |

These results demonstrate the effectiveness of 1,3,4,7-tetramethylisoindolenine as an oxygen-scavenging agent.

If, instead of using the specific compounds as described in Example A to C, other substituted isoindolenines of this invention or their salts are used in the tests, similar results are obtained to demonstrate the oxygen-scavenging properties.

While the compound 1a have been disclosed and are hereinafter claimed in terms of the isoindolenines, it is recognized that by virtue of their structure, they can also exist in tautomeric form, as follows:

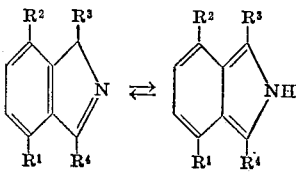

I claim:
1. A process of producing a substituted isondolenine having the formula:

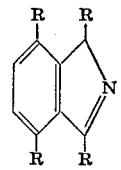

which comprises heating a 2,5-dialkyl-substituted pyrrole having the formula:

wherein the groups R are the same or different and each is an alkyl group containing from one to six carbon atoms, with an aqueous, non-oxidizing mineral acid selected from the group consisting of sulfuric acid, phosphoric acid and hydrochloric acid, substantially in the absence of molecular oxygen.

2. A process according to claim 1 wherein the 2,5-disubstituted pyrrole is a member selected from the group consisting of 2,5-dimethylpyrrole and 2,5-diethylpyrrole.

3. A process according to claim 1, wherein heating is carried out by refluxing a mixture of said substituted pyrrole and said aqueous mineral acid in an atmosphere of nonoxidizing inert gas.

4. A process according to claim 3, wherein said inert gas is nitrogen.

5. A process according to claim 2, wherein a mixture of said substituted pyrrole and an aqueous mineral acid selected from the group consisting of sulphuric acid, phosphoric acid and hydrochloric acid is heated by refluxing in an atmosphere of nitrogen to produce the correspondingly substituted isoindolenine.

References Cited

UNITED STATES PATENTS 3,007,939    11/1961    Norton _____ 260—326.1

NICHOLAS S. RIZZO, Primary Examiner.

J. A. NARCAVAGE, Assistant Examiner.

U.S. Cl. X.R.

252—178, 188, 401